(12) United States Patent
Shinoda

(10) Patent No.: US 7,602,674 B2
(45) Date of Patent: Oct. 13, 2009

(54) OPTICAL RECORDING MEDIUM AND OPTICAL RECORDING AND REPRODUCING METHOD USING THIS OPTICAL RECORDING MEDIUM

(75) Inventor: Masataka Shinoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 10/826,733

(22) Filed: Apr. 16, 2004

(65) Prior Publication Data
US 2004/0240375 A1 Dec. 2, 2004

(30) Foreign Application Priority Data
Apr. 18, 2003 (JP) .................... JP2003-114862

(51) Int. Cl.
*G11B 11/00* (2006.01)
(52) U.S. Cl. .................... 369/13.13; 369/13.15
(58) Field of Classification Search ............ None
See application file for complete search history.

(56) References Cited

U.S. PATENT DOCUMENTS

| | | | |
|---|---|---|---|
| 5,004,307 A | | 4/1991 | Kino et al. |
| 5,024,927 A | * | 6/1991 | Yamada et al. .......... 430/270.14 |
| 5,095,479 A | * | 3/1992 | Harigaya et al. ............ 369/288 |
| 5,644,566 A | * | 7/1997 | Nakayama et al. ....... 369/275.2 |
| 6,043,940 A | * | 3/2000 | Kamiyama et al. .......... 359/719 |
| 6,061,322 A | * | 5/2000 | Jain et al. ..................... 369/99 |
| 6,197,399 B1 | * | 3/2001 | Naito et al. ................ 428/64.1 |
| 6,243,350 B1 | * | 6/2001 | Knight et al. ............... 369/126 |
| 6,441,359 B1 | * | 8/2002 | Cozier et al. ................ 250/216 |
| 6,483,801 B1 | * | 11/2002 | Novotny et al. ............. 369/300 |
| 6,600,714 B2 | * | 7/2003 | Ichimura et al. ......... 369/275.1 |
| 6,704,250 B1 | * | 3/2004 | Ueyanagi ................. 369/13.33 |
| 2003/0048740 A1 | * | 3/2003 | Nagoya et al. ......... 369/112.28 |
| 2003/0118936 A1 | * | 6/2003 | Okubo .................. 430/270.12 |

OTHER PUBLICATIONS

Tom D. Milster, Chromatic Correction of High-Performance Solid Immersion Lens Systems, Optical Data Storage Center/Optical Science Center, University of Arizona, Dec. 8, 1988.

* cited by examiner

*Primary Examiner*—Joseph H Feild
*Assistant Examiner*—Tawfik Goma
(74) *Attorney, Agent, or Firm*—Robert J. Depke; Rockey, Depke & Lyons, LLC

(57) ABSTRACT

An optical recording medium 10 is recorded and reproduced with irradiation of light L and recorded pits are recorded with irradiation of light L through an objective lens 4 of which numerical aperture is greater than 1, at least a silicon layer 3 and a silicon oxide layer 2 being formed from the light irradiation side, in that order. An optical recording medium and an optical recording and reproducing method thereof are suitable for use with a near-field optical recording and reproducing system using an objective lens of which numerical aperture is greater than 1.

13 Claims, 18 Drawing Sheets

When n<NA is Satisfied

When n≧NA is Satisfied

OPTICAL RECORDING MEDIUM AND OPTICAL RECORDING AND REPRODUCING METHOD USING THIS OPTICAL RECORDING MEDIUM

BACKGROUND OF THE INVENTION

1. Field of the Invention

The present invention relates to an optical recording medium for recording and reproducing information in a near-field optical recording and reproducing system by the use of an objective lens of which numerical aperture is greater than 1 and an optical recording and reproducing method using this optical recording medium.

2. Description of the Related Art

Various kinds of optical recording mediums typically represented by a CD (Compact Disc), an MD (Mini Disc) and a DVD (Digital Versatile Disc) have been so far widely used as storage mediums for use in storing a variety of information such as music information, video information, data and programs. However, as music information, video information, data and programs are becoming higher in sound quality, are becoming longer in recording and playing time and they are becoming large in capacity, a demand for realizing an optical recording medium having a larger storage capacity and a demand for realizing an optical recording and reproducing device for recording and reproducing this optical recording medium are further increasing.

Therefore, in order to satisfy such demands, in various kinds of optical recording and reproducing device, its light source, for example, its semiconductor laser has been reduced in wavelength and a numerical aperture of its objective lens has been increased, whereby a spot of a light beam focused by the objective lens is reduced in diameter.

With respect to semiconductor lasers, for example, a GaN semiconductor laser with its oscillation wavelength reduced to the wavelength region of 400 nm from 635 nm of a red laser has been put into practical use, and hence a beam spot of a laser beam can be reduced in diameter.

So far there has been examined a so-called near-field optical recording and reproducing system that constructs an objective lens with a numerical aperture greater than 1 by using an optical lens with a larger numerical aperture typically represented by an SIL (Solid Immersion Lens), for example. This near-field optical recording and reproducing system is able to reproduce information by decreasing a space between the opposing surface of this objective lens and an optical recording medium up to approximately a wavelength of a light source or approximately one-tenth of the wavelength of the light source.

FIG. 1 of the accompanying drawings is a schematic diagram showing an arrangement of an example of an optical system of a near-field optical recording and reproducing system according to the related art. As shown in FIG. 1, this near-field optical recording and reproducing system is realized by an objective lens 23 composed of a first optical lens 21 made of a high refractive index material, for example, and which is finished like a super-hemispherical shape and the like and a second optical lens 22 made of a suitable lens such as a convex lens, the first optical lens 21 and the second optical lens 22 being arrayed from the side of an optical recording medium 10, in that order (see cited non-patent reference 1, for example).

In order to increase a recording density in this near-field optical recording and reproducing system, similarly to the related-art optical reproducing system, a wavelength of light emitted from its light source should be decreased and a numerical aperture of its objective lens should be increased, thereby reducing a beam spot of its focused laser beam in diameter.

An area of a beam spot of a laser beam is in inverse proportion to the square of a numerical aperture of an objective lens, and hence in order to realize a high recording density in the near-field optical recording and reproducing system, it is effective to increase a numerical aperture of an objective lens.

As in the example that has been described so far with reference to FIG. 1, for example, a numerical aperture NA of a near-field objective lens obtained when the first optical lens 21 is composed of the super-hemisphere optical lens is expressed by the following equation:

$$NA = n_{L1} \times n_{L1} \times \sin \theta_{AIR}$$

Where $n_{L1}$ represents the refractive index of the first optical lens 21 and $\theta_{AIR}$ represents the angle of incidence of light L incident on the first optical lens 21 in the air (see cited non-patent reference 1, for example).

Accordingly, it becomes necessary to increase the refractive index of the first optical lens in order to increase the numerical aperture of the objective lens.

However, even when the refractive index of the first optical lens 21 increases and the numerical aperture NA of the objective lens 23 increases, satisfactory recording and reproducing characteristics cannot be obtained so that it is difficult at present to realize a high recording density and a large storage capacity in the near-field optical recording and reproducing system.

At the same time, in the near-field optical recording and reproducing system in which the optical recording medium and the objective lens are located close to each other by a space up to several 10 s of nanometers, the surface of the optical recording medium should be made clean and should have very flat properties. In particular, when the near-field optical recording is effected, after recorded pits have been formed with illumination of laser beams, the surface of the optical recording medium should be prevented from being deformed in a convex fashion and a substance on the surface of the optical recording medium should be prevented from being evaporated and attached to the surface of the objective lens.

Further, since the diameter of the beam spot of the laser beam focused by the objective lens is extremely small, it is requested that the optical recording medium should be made of a material that is durable to an extreme rise of temperature on the surface of the optical recording medium.

Furthermore, since general consumers becoming to consume and waste a large amount of recording-type mediums such as an MD and a DVD as personal computers are being widespread in recent years, in consideration of loads to the natural environment, next-generation optical recording mediums should be of optical recording mediums made of materials that are not dangerous and harmful for circumstances and which exert small loads upon natural environment, that is, materials that can be recycled.

[Cited Non-Patent Reference 1]

T. D. Milster, "Chromatic Correction of High-Performance Solid Immersion Lens Systems", Jpn. J. Appl. Phys., March 1999, Vol. 38, Part 1, No. 3B, pp. 1777 to 1779.

SUMMARY OF THE INVENTION

In view of the aforesaid aspect, it is an object of the present invention to provide an optical recording medium in which performance of a numerical aperture of an objective lens can be demonstrated sufficiently.

It is another object of the present invention to provide an optical recording medium suitable for a near-field optical recording and reproducing system using an objective lens with a high numerical aperture.

It is other object of the present invention to provide an optical recording medium whose load imposed upon natural environments is small It is a further object of the present invention to provide an optical recording and reproducing method using such optical recording medium that can be applied to the increase of recording density and storage capacity.

According to an aspect of the present invention, there is provided an optical recording medium recorded and reproduced with irradiation of light thereon, the irradiation of light being made by an objective lens of which numerical aperture is larger than 1 to record and reproduce recorded pits. This optical recording medium comprises at least a silicon layer and a silicon oxide layer being formed from the light irradiation side, in that order.

According to another aspect of the present invention, there is provided an optical recording and reproducing method for recording and reproducing an optical recording medium with irradiation of light, the light being irradiated through an objective lens of which numerical aperture is larger than 1 and using the optical recording medium in which recorded pits are recorded and reproduced, wherein the optical recording medium has at least a silicon layer and a silicon oxide layer formed thereon from the light irradiation side, in that order, the recorded pits being formed by changing the silicon layer into silicon oxide.

In the optical recording medium and the optical recording and reproducing method according to the present invention, information is recorded on and reproduced from the optical recording medium with illumination of light, and irradiation of light is made through an objective lens with a numerical aperture greater than 1 and thereby recorded pits are recorded. This optical recording medium has an arrangement in which recorded pits are reproduced in a so-called near-field recording and reproducing system and in which the silicon layer and the silicon oxide layer are formed from the light irradiation side, in that order.

According to the above-mentioned arrangement, as will be described in detail in the later stage of the embodiments of the present invention, the refractive index of the silicon layer can be changed by properly illuminating light on the silicon layer and hence information can be positively reproduced from the optical recording medium with satisfactory reproducing characteristics in a near-field optical recording and reproducing system. As a result, it is possible to provide an optical recording medium with a high recording density and a large storage capacity in actual practice and an optical recording and reproducing method using this optical recording medium.

DESCRIPTION OF THE PREFERRED EMBODIMENTS

An optical recording medium and an optical recording and reproducing method using this optical recording medium according to the embodiments of the present invention will be described in detail with reference to the accompanying drawings.

Figure 2:
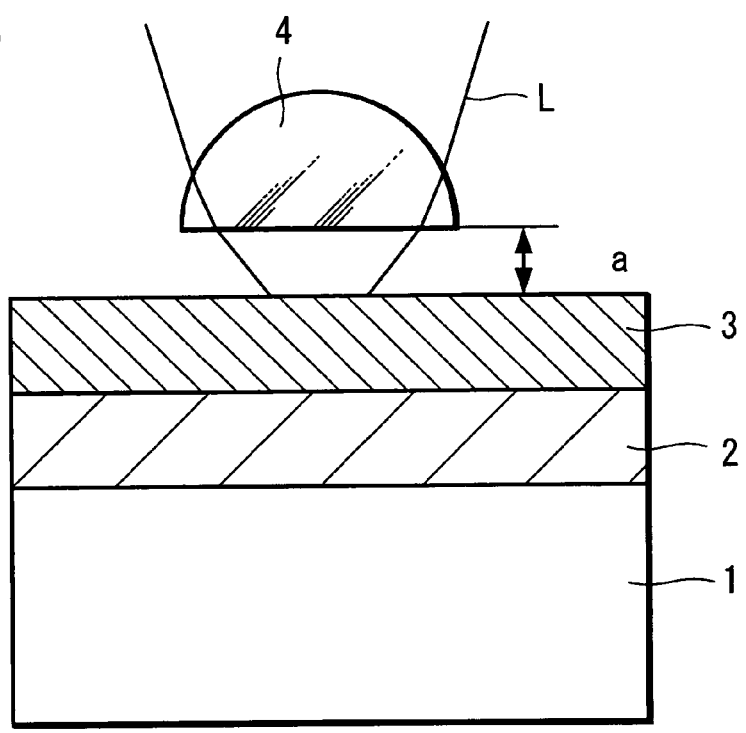
FIG. 2 is a schematic cross-sectional view showing a main portion of an example of an optical recording medium according to the present invention in an enlarged-scale.

FIG. 2 is a schematic cross-sectional view showing a main portion of an example of an optical recording medium according to the present invention in an enlarged-scale. As shown in FIG. 2, this optical recording medium has a substrate 1 on which there are laminated a silicon oxide layer 2 and a silicon layer 3, in that order, that is, the silicon layer 3 and the silicon oxide layer 2 are provided from the light irradiation side.

The silicon oxide layer 2 and the silicon layer 3 can be laminated on the substrate 1 made of a resin such as polycarbonate or glass, silicon and aluminum. Recording and reproducing light L is irradiated on the optical recording medium such that this optical recording medium is opposed to an objective lens 1 with a numerical aperture greater than 1 with a predetermined distance a. Although not shown, the substrate 1 may have formed on its surface focusing and tracking pits and guide grooves along recording tracks.

The silicon layer 3 and the silicon oxide layer 2 comprising the recording portion of the optical recording medium can be formed on an insulating substrate, for example, such that its film thickness can be controlled with high accuracy by a suitable well-known technology such as an SOI (Silicon On Insulator) technology. By using this well-known technology, it is possible to add arbitrary additives to the silicon layer 3 and the silicon oxide layer 2 with desired ratios.

In addition, with this SOI substrate forming technology, it is possible to deposit an arbitrary protective film on the surface of the silicon layer 3 that is formed on the uppermost surface of the optical recording medium.

Figure 1:
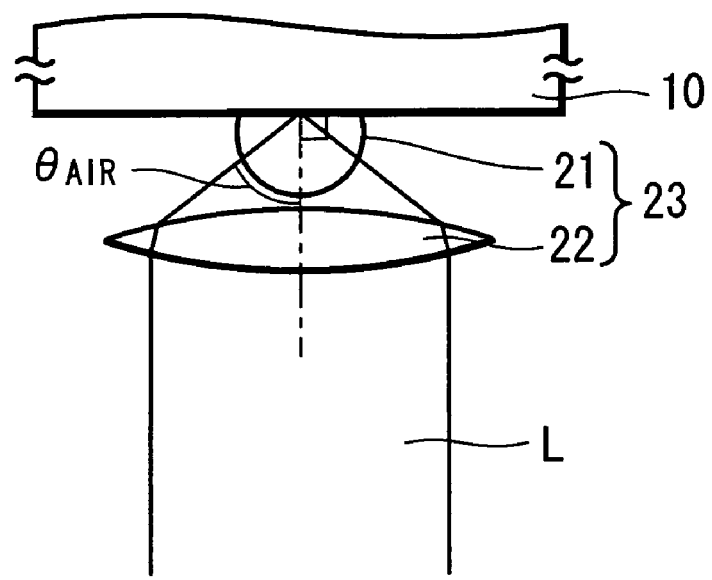
FIG. 1 is a schematic diagram showing an arrangement of an example of an optical system of a near-field optical recording and reproducing system according to the related art.

According to the present invention, this optical recording medium is irradiated with recording and reproducing light from the side of the silicon layer 3 by the objective lens 4 with the numerical aperture NA greater than 1. When the SIL is in use, as shown in the aforementioned example of FIG. 1, this objective lens 4 may be the objective lens 23 composed of the first optical lens 21 and the second optical lens 22 as shown in FIG. 1.

Figure 3:
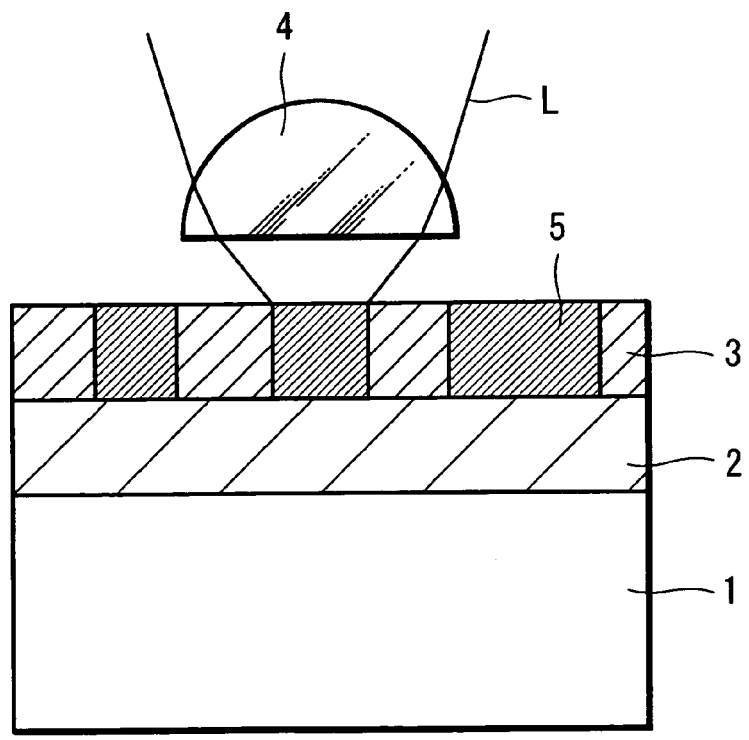
FIG. 3 is a schematic cross-sectional view showing a main portion of an example of an optical recording medium according to the present invention in an enlarged-scale.

By using the objective lens 4 of which numerical aperture Na is greater than 1, recording light L is irradiated on the silicon layer 3 of the optical recording medium having the arrangement according to the present invention to form recorded pits on the silicon layer 3 as shown in FIG. 3. FIG. 3 is a schematic cross-sectional view showing an arrangement of a main portion of an example of an optical recording medium according to the present invention in an enlarged-scale. In FIG. 3, elements and parts identical to those of FIG. 2 are denoted by the identical reference numerals.

It is known that a refractive index of silicon exhibits a high value greater than 2.0 in the wavelength region in which a wavelength ranges from 300 nm to 500 nm, in particular. The inventor of the present application has discovered that a numerical value of a refractive index of the uppermost surface portion of, in particular, an optical recording medium is important in order to realize a high recording density with satisfactory characteristics when information is recorded on and reproduced from the optical recording medium by using an objective lens with a numerical aperture greater than 1 in the so-called near-field recording and reproducing system.

More specifically, it is to be appreciated that, with the above-mentioned arrangement of the present invention, recording and reproduction with an effective larger numerical aperture, which could not be realized so far by an optical recording medium in which a refractive index of a recording portion or an uppermost surface portion is smaller than the numerical aperture NA of the objective lens, can be realized.

Figure 4A:
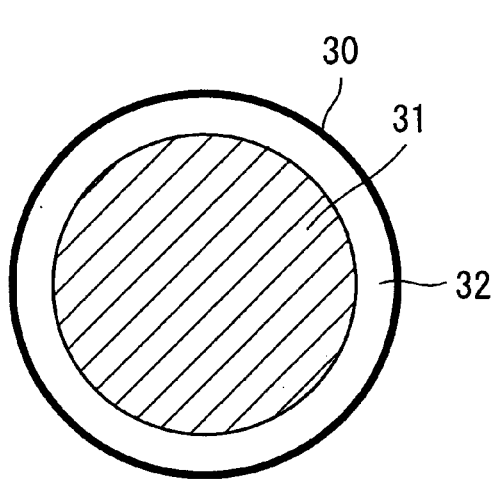
FIG. 4A is a diagram to which reference will be made in explaining a relationship between a numerical aperture NA of an objective lens and a refractive index n of an optical recording medium according to the related art.
Figure 4B:
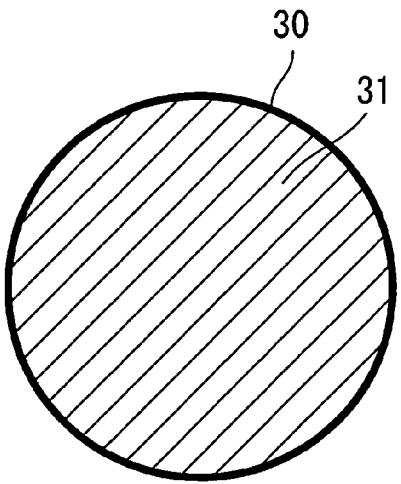
FIG. 4B is a diagram to which reference will be made in explaining a relationship between a numerical aperture NA of an objective lens and a refractive index n of an optical recording medium according to the present invention.

This will be described below with reference to FIGS. 4A and 4B which show the related art and the present invention for comparison. FIG. 4A shows the case of the optical recording medium having the arrangement according to the related art, and FIG. 4B shows the case of the optical recording medium having the arrangement according to the present invention. As shown in FIG. 4A, in the case of the optical recording medium according to the related art, a relationship between a refractive index n of the recording portion or the uppermost surface portion of the optical recording medium and the numerical aperture NA of the objective lens satisfies n<NA. At that time, as shown in FIG. 4A, an area 31 in which returned light is observed becomes smaller relative to an incident light irradiated area 30.

However, as shown in FIG. 4B, in the case of the optical recording medium having the arrangement according to the present invention, the refractive index n of the recording portion formed in the uppermost surface can easily be brought into a relationship that satisfies n≧NA and hence it is to be understood that the incident light irradiated area 30 and the returned light observed area 31 can be made substantially the same in size. More specifically, according to the present invention, it is to be appreciated that the effective numerical aperture of the objective lens can increase as compared with the related-art optical recording medium.

Further, according to the present invention, in this optical recording medium, an additive can be added to the silicon layer 3 or the silicon oxide layer 2 or both of the silicon layer 3 and the silicon oxide layer 2.

By adding the additive into the silicon layer 3 and the silicon oxide layer 2, it becomes possible to adjust thermal conductivity. In addition, by properly selecting a film thickness of each layer, thermal recording sensitivity can be adjusted in accordance with specifications such as a wavelength of a light source and energy of a light source.

Figure 5:
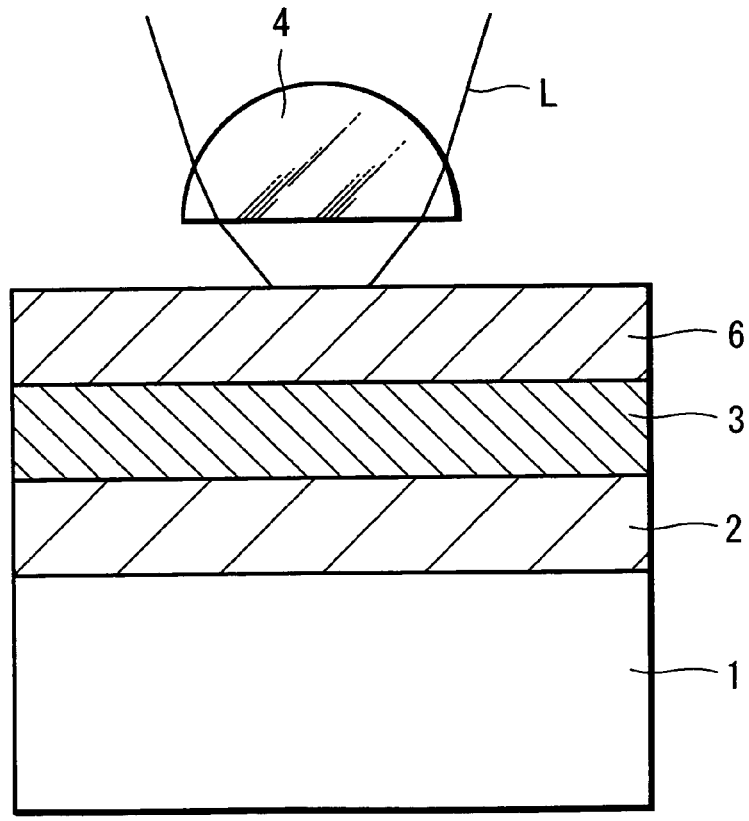
FIG. 5 is a schematic cross-sectional view showing a main portion of an example of an optical recording medium according to the present invention.
Figure 6:
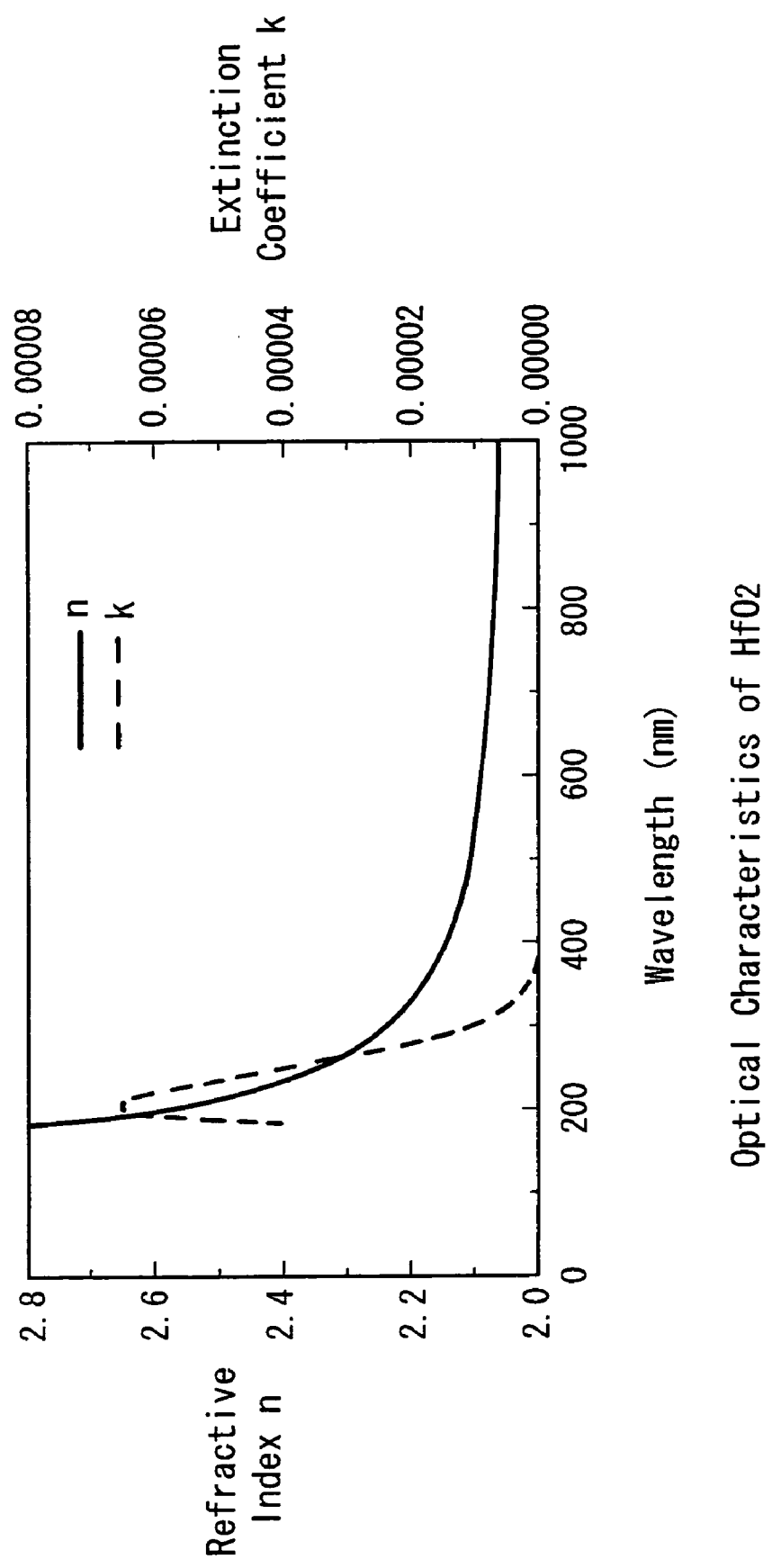
FIG. 6 is a diagram showing wavelength dependences of a refractive index and an extinction coefficient of $HfO_2$.
Figure 7:
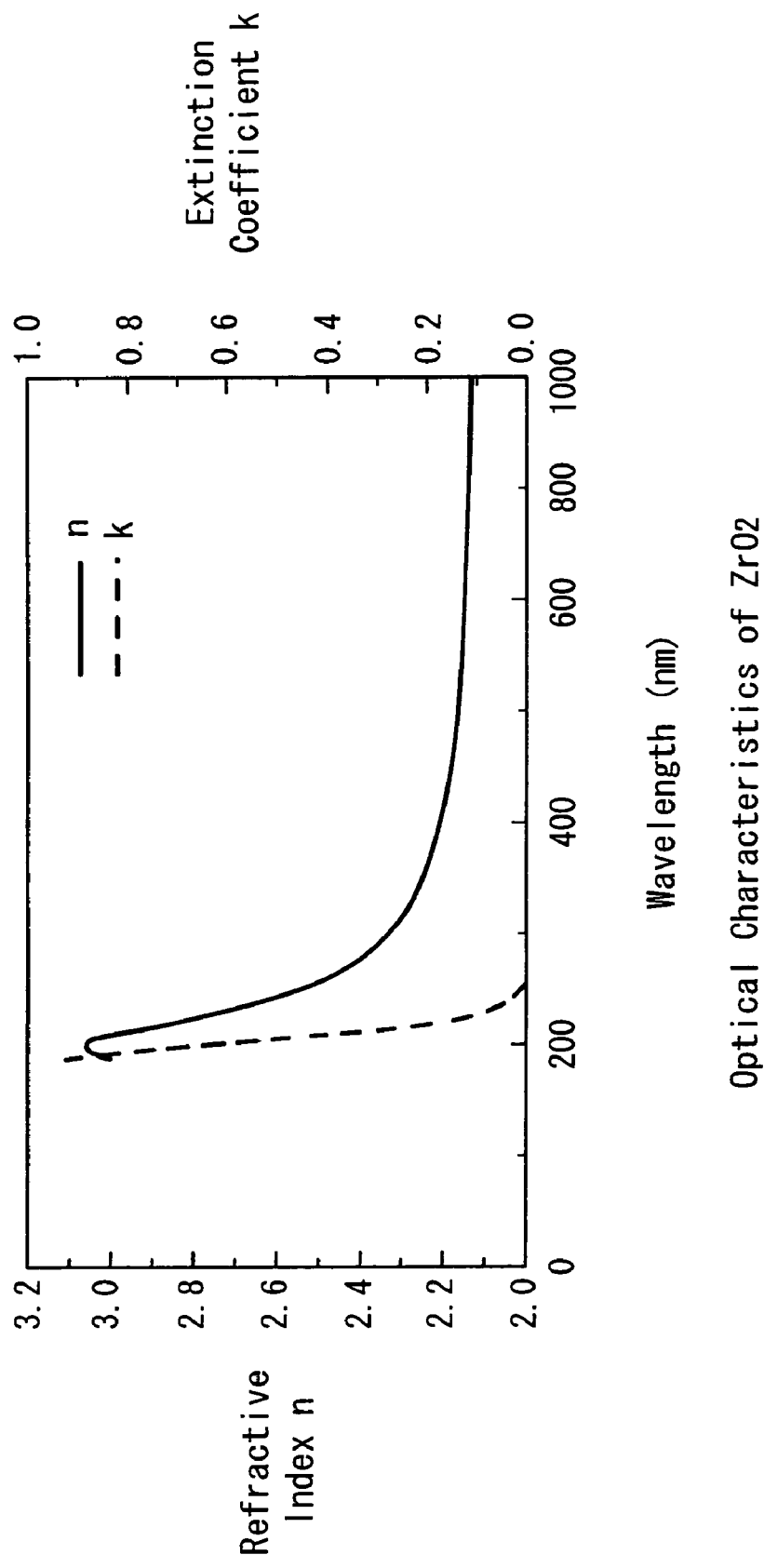
FIG. 7 is a diagram showing wavelength dependences of a refractive index and an extinction coefficient of $ZrO_2$.
Figure 8:
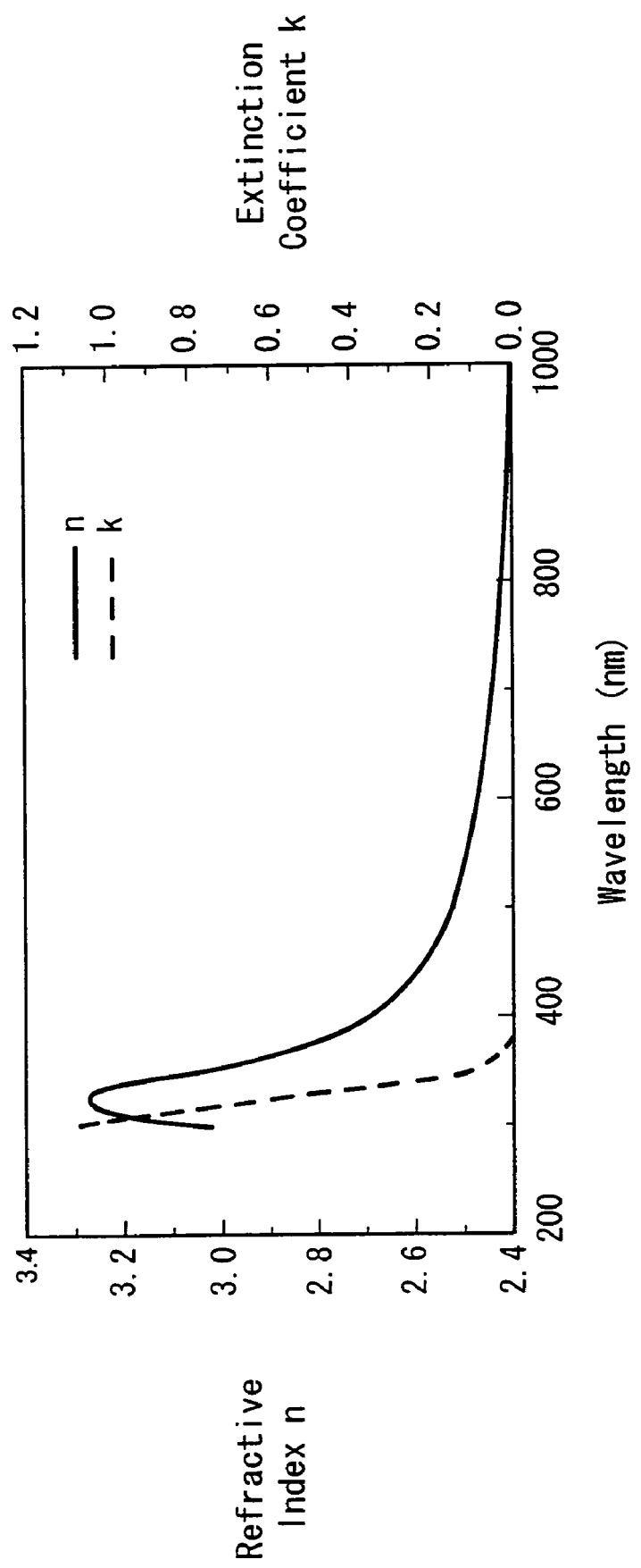
FIG. 8 is a diagram showing wavelength dependences of a refractive index and an extinction coefficient of $TiO_2$.
Figure 9:
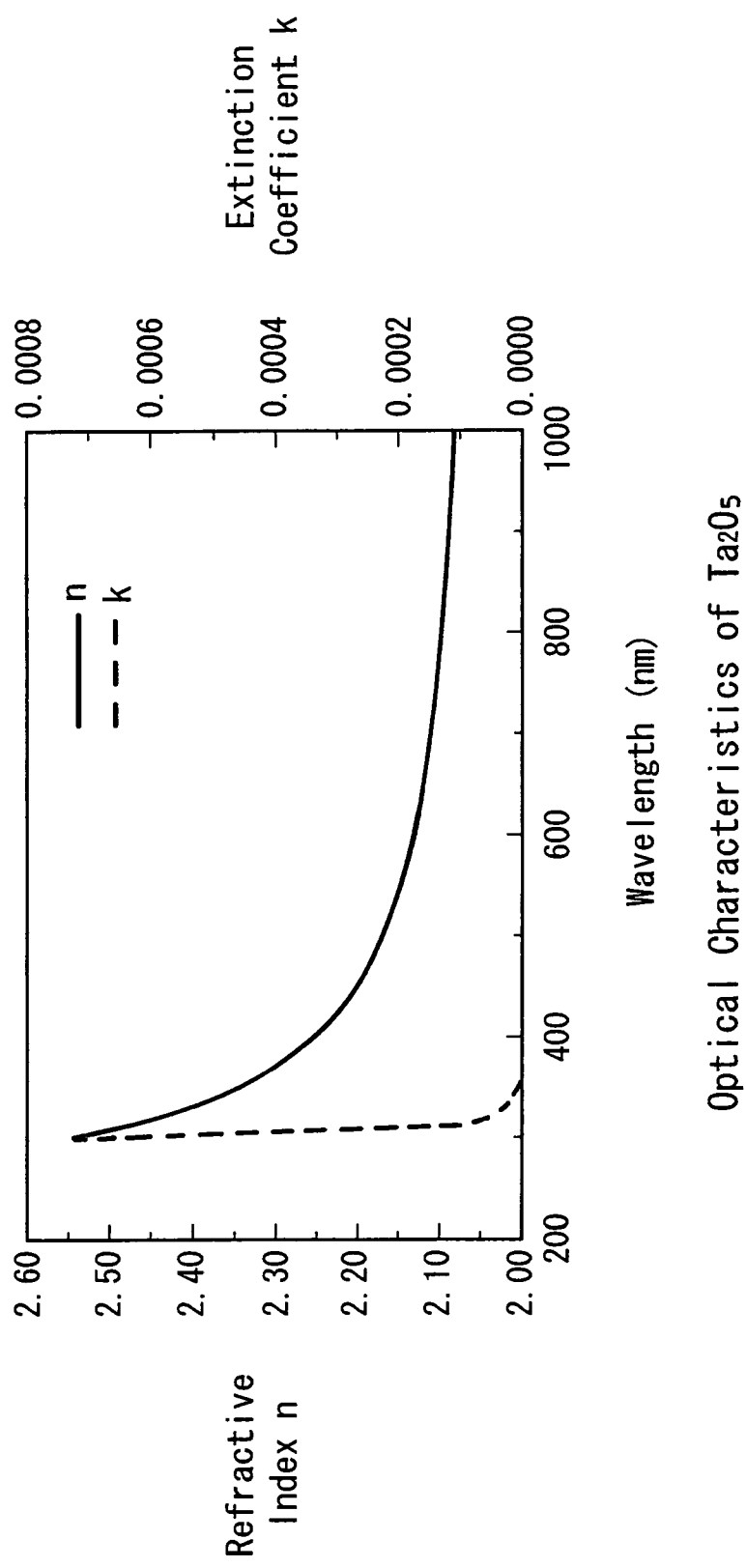
FIG. 9 is a diagram showing wavelength dependences of a refractive index and an extinction coefficient of $Ta_2O_5$.
Figure 10:
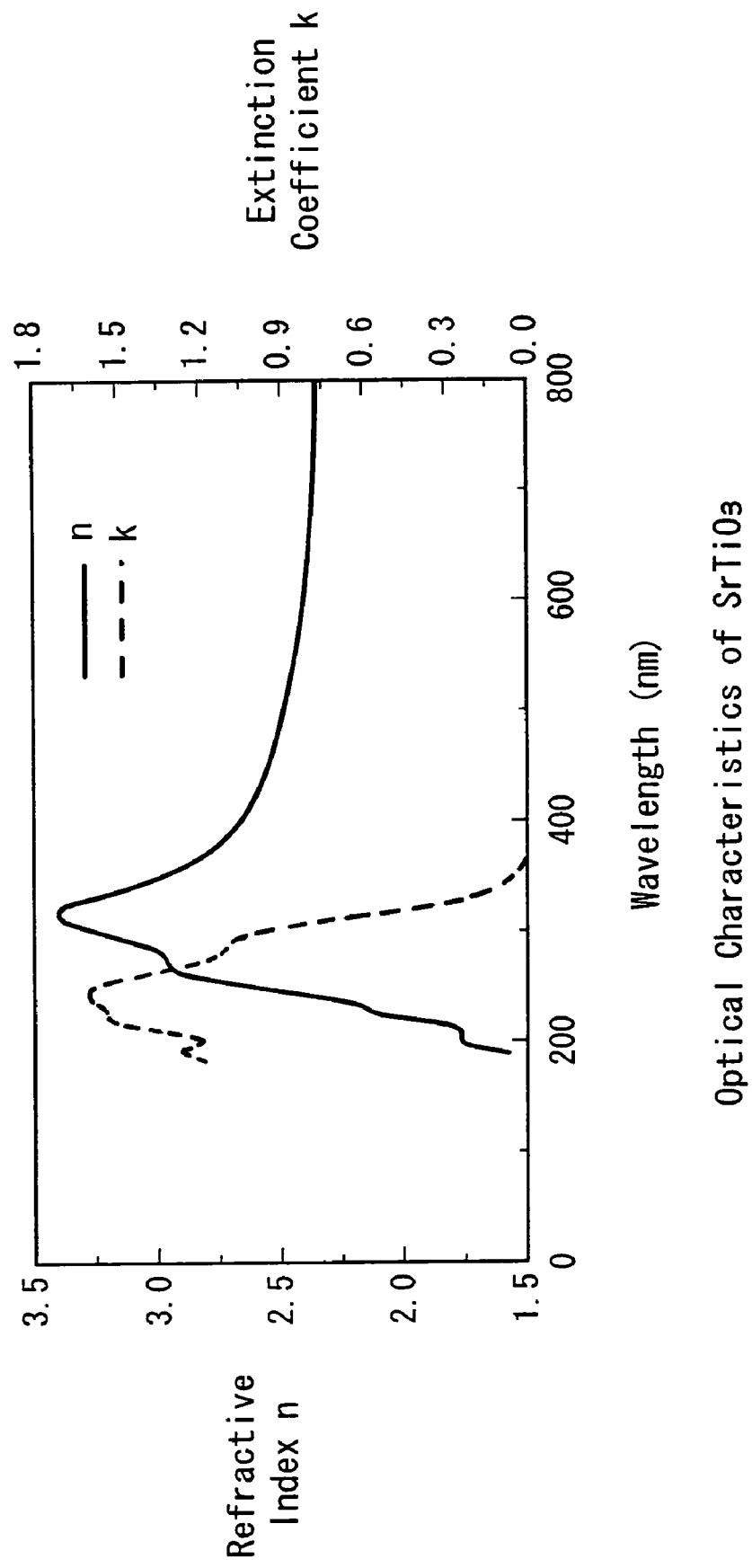
FIG. 10 is a diagram showing wavelength dependences of a refractive index and an extinction coefficient of $SrTiO_3$.
Figure 11:
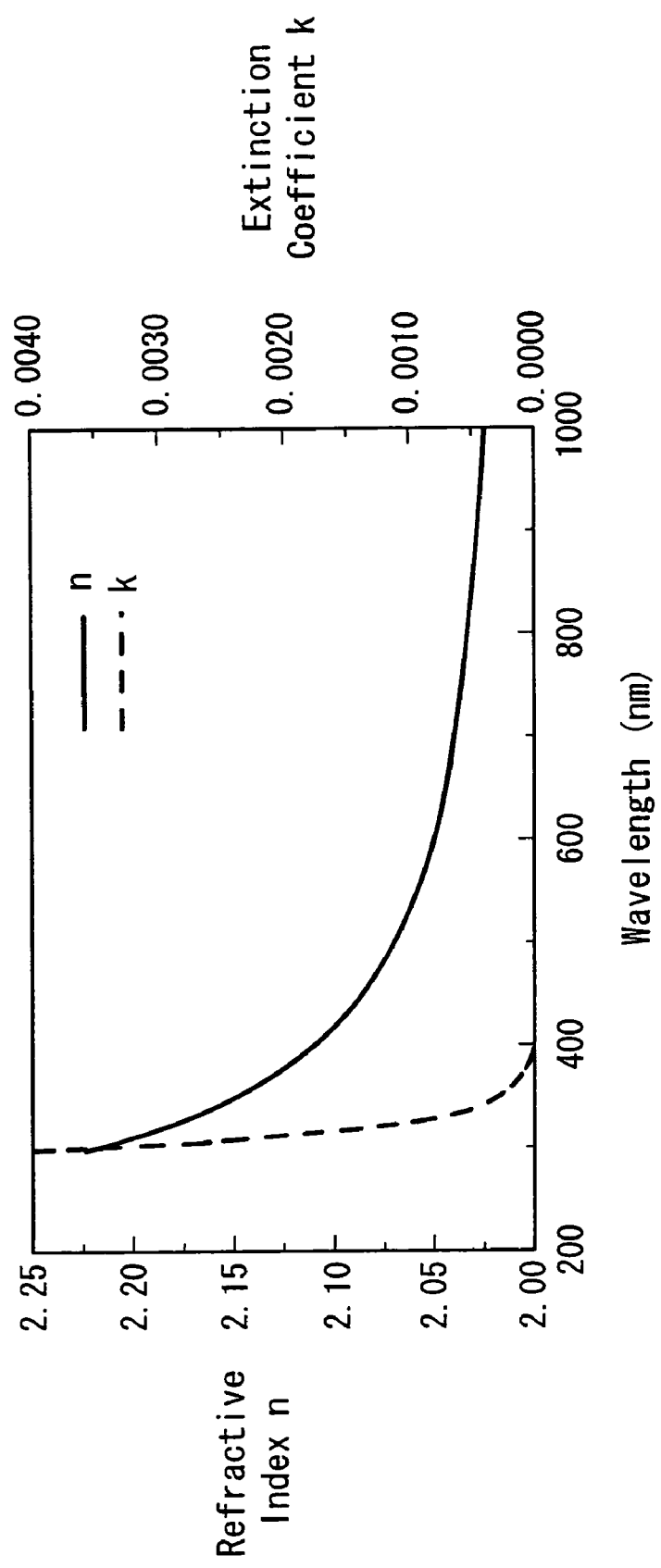
FIG. 11 is a diagram showing wavelength dependences of a refractive index and an extinction coefficient of silicon nitride.
Figure 12:
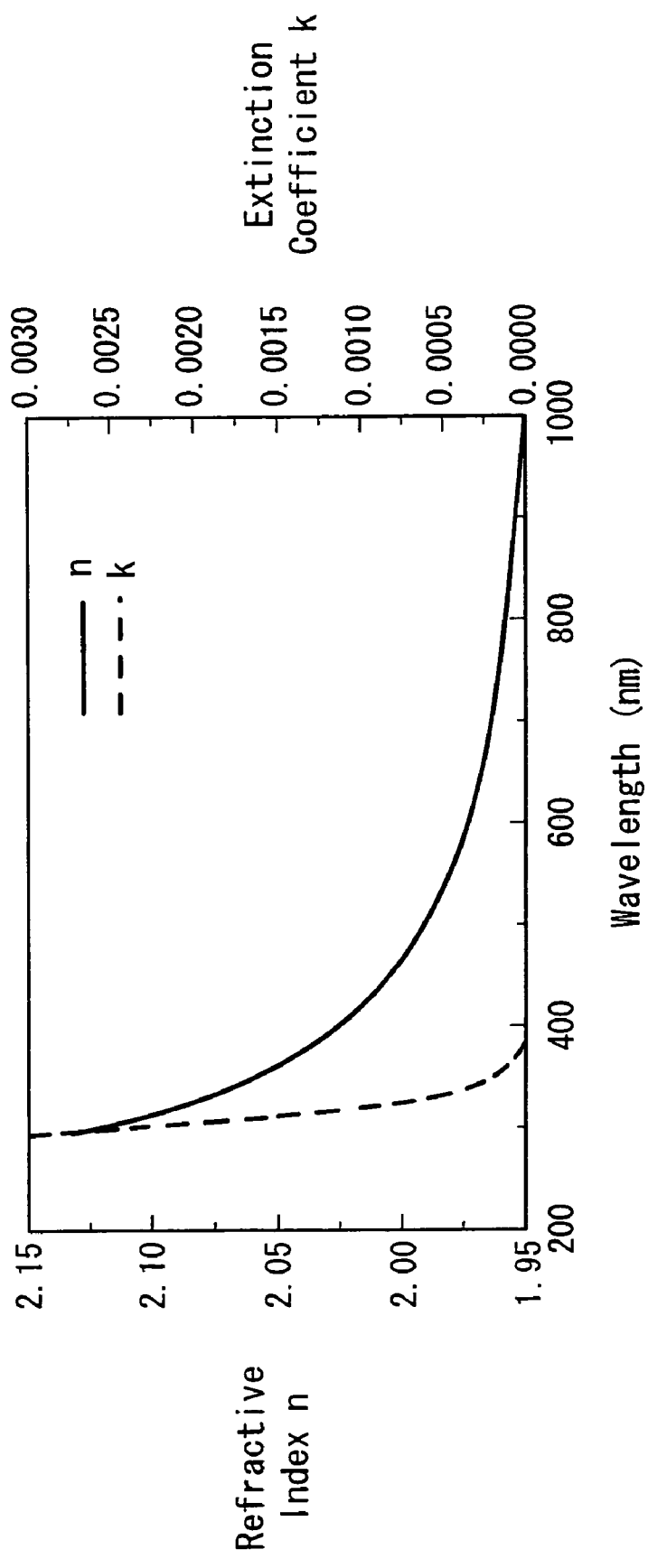
FIG. 12 is a diagram showing wavelength dependences of a refractive index and an extinction coefficient of aluminum nitride.
Figure 13:
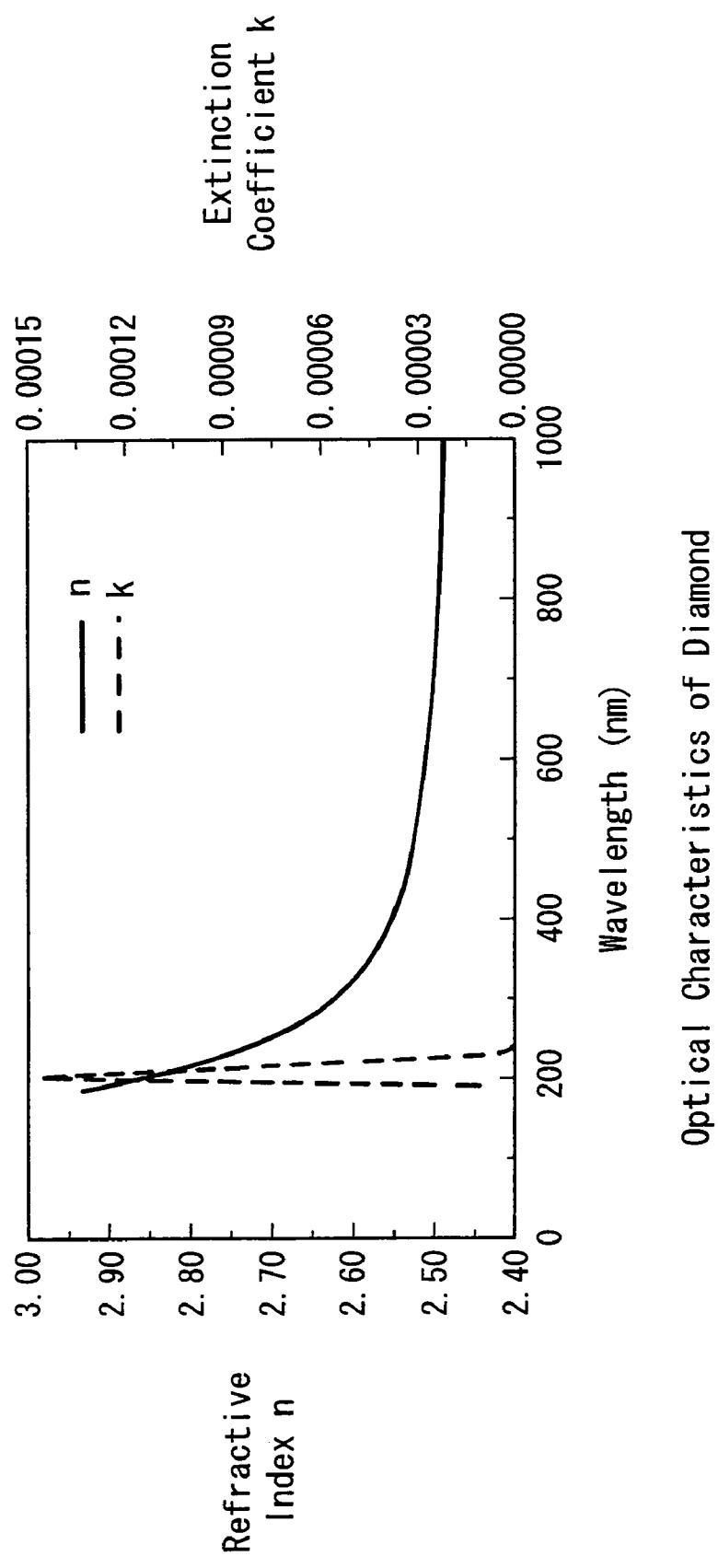
FIG. 13 is a diagram showing wavelength dependences of a refractive index and an extinction coefficient of diamond.

Furthermore, in the optical recording medium according to the present invention, a protective layer 6 made of a material having a refractive index larger than the numerical aperture NA of the objective lens 4 may be formed on the upper layer of the silicon layer 3 as shown in FIG. 5. FIG. 5 is a schematic cross-sectional view showing a main portion of an example of such optical recording medium in an enlarged-scale. In FIG. 5, elements and parts identical to those of FIGS. 2 and 3 are denoted by the identical reference numerals.

In this case, when the surface of the silicon layer 3 is protected, the surface of the silicon layer 3 can be prevented from being smudged by dusts, for example, or the surface of the silicon layer 3 can be prevented from being damaged due to contact with the objective lens 4. As a consequence, durability of the objective lens and the optical recording medium can be improved.

As described above, it is possible to hold satisfactory recording and reproducing characteristics by using the material having the refractive index greater than the numerical aperture of the objective lens as the protective layer.

As the protective layer material having the refractive index greater than the numerical aperture of the objective lens, there can be applied $HfO_2$, $ZrO_2$, $Ta_2O_5$, $SrTiO_3$, silicon nitride, aluminum nitride, boron nitride, diamond, diamond-like carbon and the like of which refractive indexes are relatively large.

FIGS. 6 to 13 show wavelength dependences of refractive indexes and extinction coefficients of $HfO_2$, $ZrO_2$, $Ta_2O_5$, $SrTiO_3$, silicon nitride, aluminum nitride, boron nitride and diamond. Throughout FIGS. 6 to 13, the solid lines show the refractive indexes n, and the dashed lines show the extinction coefficients k. A study of FIGS. 6 to 13 reveals that the above-described materials exhibit sufficiently high refractive indexes in the wavelength band which is assumed in an optical recording medium of high recording density recording using an objective lens with a numerical aperture greater than 1, for example, in a wide wavelength region in which a wavelength ranges from 300 nm to 800 nm.

Further, a lubricant film can be deposited on the silicon layer or this protective film so as to have a film thickness in a range in which it should not affect the optical recording medium optically in order to supply lubrication and to prevent abrasion between the objective lens and the optical recording medium.

In the respective arrangements of the above-mentioned embodiments, as the first optical lens 21, there can be used lenses of various shapes shown in FIGS. 14, 15, 16 and 17 which will be described below.

Figure 14:
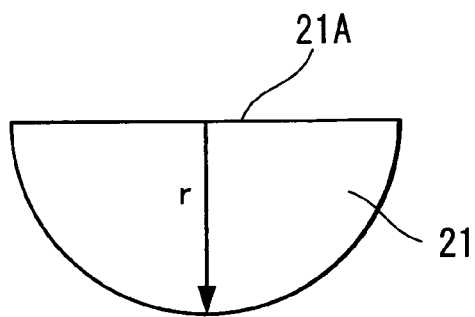
FIG. 14 is a schematic cross-sectional view showing an example of an objective lens.

FIG. 14 is a schematic cross-sectional view showing an example of a first optical lens 21 in an enlarged-scale. In this case, the first optical lens 21 is shaped like a hemispherical optical lens in cross section. Reference letter r denotes a radius of the hemisphere of the first optical lens 21. An objective lens surface 21A opposing the optical recording medium is formed as a substantially circular flat surface. A circumferential side surface of this objective lens surface 21A may be formed as a surface to which there may be fixed a supporting body for supporting a biaxial actuator or a slider for holding the optical lens 21 and which adjusts the spacing between the first optical lens 21 and the surface of the optical recording medium.

Figure 15:
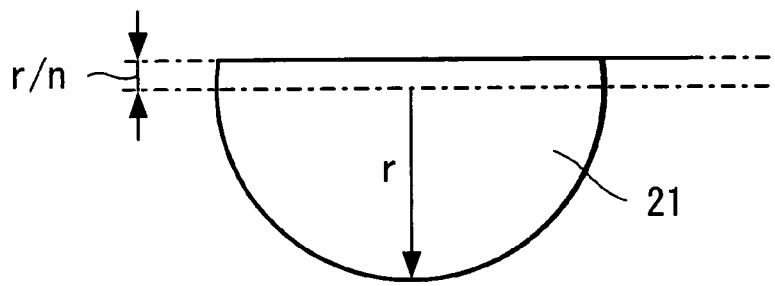
FIG. 15 is a schematic cross-sectional view showing other example of an objective lens.

FIG. 15 is a schematic cross-sectional view showing other example of the first optical lens 21 in an enlarged-scale. As shown in FIG. 15, the first optical lens 21 may be shaped as a super-hemispherical optical lens.

Figure 16:
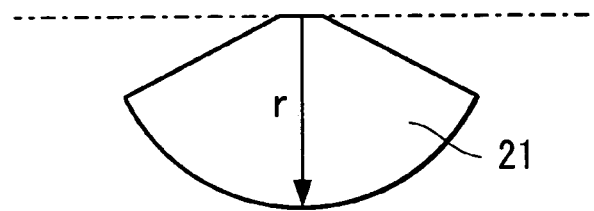
FIG. 16 is a schematic cross-sectional view showing a further example of an objective lens.
Figure 17:
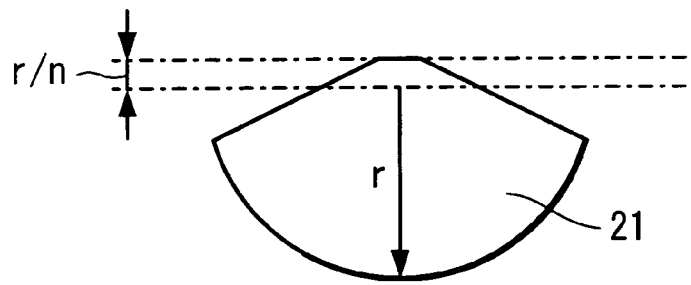
FIG. 17 is a schematic cross-sectional view showing yet a further example of an objective lens.

Also, in the near-field optical recording and reproducing system, since the optical recording medium 11 and the first optical lens 21 are located very close to each other with a distance of approximately several 10 s of nanometers, in order to increase tolerance of an inclination of the optical recording medium 11 or the first optical lens 21, the first optical lens 21 may be formed as an optical lens in which the opposing surface of the optical lens 21 is shaped like a conical surface as shown in FIG. 16 or 17. FIG. 16 is a schematic cross-sectional view showing a main portion of a further example of the optical lens 21 in an enlarged-scale, and FIG. 17 is a like schematic cross-sectional view showing a main portion of yet a further example of the optical lens 21 in an enlarged-scale.

So long as the refractive index of the optical lens 21 is as large as possible, the numerical aperture of the optical lens can increase. Therefore, preferably, the optical lens 21 may be made of a high refractive index material or a material of which main component is a high refractive index glass or a material of which main component is $ZrO_2$ or a material of which main component is $SrTiO_3$ or a material of which main component is $Bi_4Ge_2O_{12}$ or $Bi_4Ge_3O_{12}$.

Optical lens materials such as the high refractive index glass and the materials of which main components are $ZrO_2$, $SrTiO_2$ and $Bi_4Ge_3O_{12}$ have high refractive indexes in the wavelength region in which a wavelength ranges from 300 nm to 800 nm, for example, a refractive index greater than 2 relative to the wavelength region of 390 nm to 420 nm which is an oscillation wavelength of a GaN semiconductor laser.

Accordingly, using the GaN semiconductor laser as its light source and the optical lens which uses the high refractive index glass and the materials of which main components are $ZrO_2$, $SrTiO_3$ and $Bi_4Ge_3O_{12}$ is a means that is very effective for reducing the wavelength of laser light of the light source and for increasing the numerical aperture of the objective lens with respect to the near-field optical recording and reproducing system, and hence this optical lens can contribute to increasing a recording density and a storage capacity of the optical recording medium.

Next, examples of an optical pickup device or an optical recording and reproducing device using the optical recording medium having the arrangement according to the present invention will be described.

Each of the optical pickup device or the optical recording and reproducing device uses the SIL type, that is, so-called near-field optical recording and reproducing system including the objective lens 23 composed of the first optical lens 21 and the second optical lens 22 arrayed from the objective lens surface side, in that order, as shown in FIG. 1.

The embodiments according to the present invention will be described below with reference to FIGS. 18, 19, 20 and 21.

Figure 18:
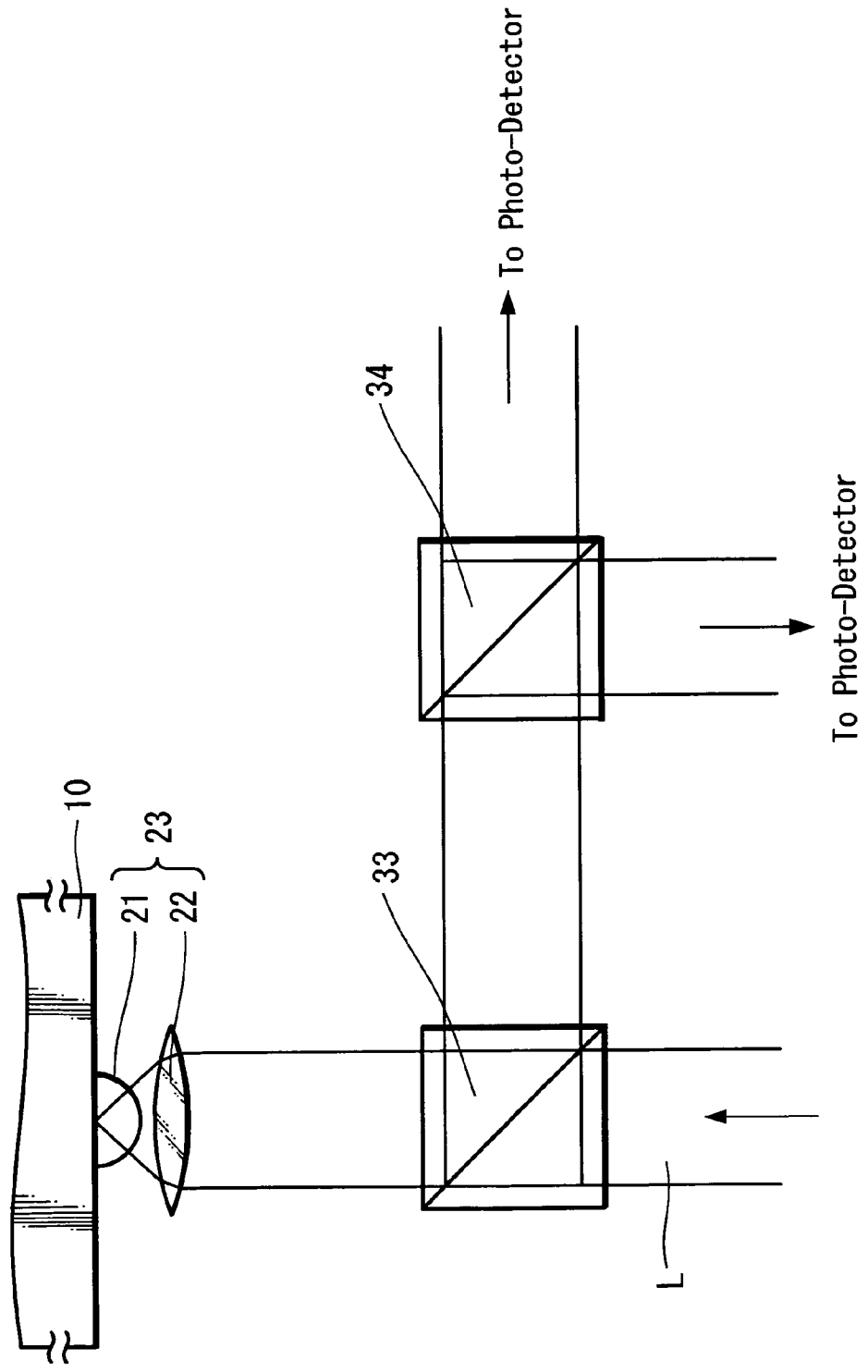
FIG. 18 is a schematic diagram showing an arrangement of a main portion of an example of an optical recording and reproducing device according to the present invention.

FIG. 18 is a schematic block diagram showing an example of an arrangement of an optical recording and reproducing device according to the embodiment of the present invention.

When an optical recording medium 10 is a disc-like optical recording medium, such optical recording medium is attached to a spindle motor (not shown) and rotated at a predetermined revolution rate.

As shown in FIG. 18, inward light L emitted from a light source, for example, a semiconductor laser is collimated into collimated light by a collimator lens (not shown). Then, this collimated light is passed through a first beam splitter 33 and focused on the recording portion of the uppermost surface of an optical recording medium 10 through the objective lens 23. In the case of the SIL type arrangement, the objective lens 23 is comprised of the first optical lens 21 and the second optical lens 22 from the side of the optical recording medium, in that order.

Outward light reflected on the information reproducing surface is traveled through the objective lens 23 and reflected by the first beam splitter 33, thereby being introduced into a second beam splitter 34. Outward light M passed through the second beam splitter 34 is focused by a focusing photo-detector (not shown) and thereby a focusing error signal and a reproducing pit signal are detected.

Outward light reflected by the second beam splitter 34 is focused by a tracking photo-detector (not shown) and thereby a tracking error signal is detected.

Figure 19:
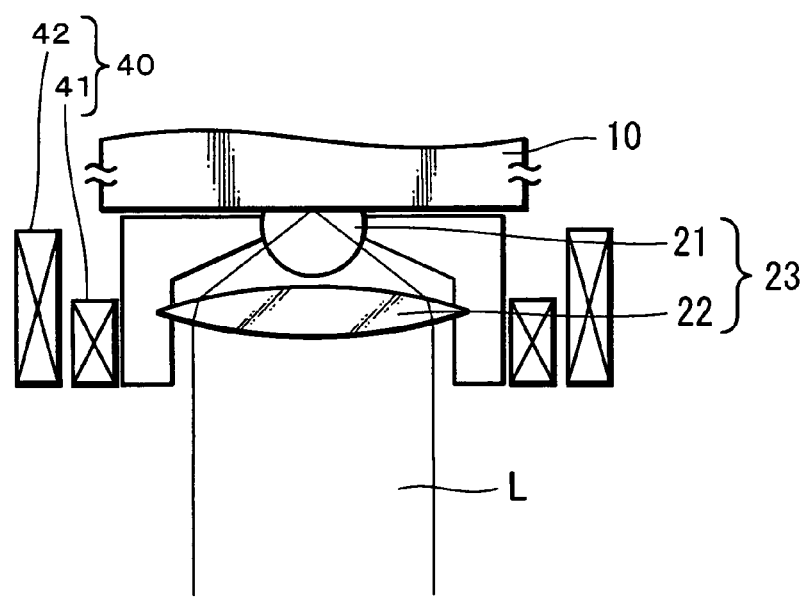
FIG. 19 is a schematic diagram showing an arrangement of a main portion of other example of an optical recording and reproducing device according to the present invention.

FIG. 19 is a schematic diagram showing an example of an arrangement of the objective lens 23. As shown in FIG. 19, the objective lens 23 is held on a biaxial actuator 40. The biaxial actuator 40 includes a focusing coil 41 and a tracking coil 42, for example, and moves the objective lens 23 in the focusing direction and in the tracking direction.

This biaxial actuator 40 can keep the distance between the optical recording medium 10 and the first optical lens 21 constant by feeding distance information back thereto after is has monitored an amount of returned light. Also, the biaxial actuator 40 can prevent the first optical lens 21 and the optical recording medium 10 being abutted with each other.

In addition, this biaxial actuator 40 can move a focused beam spot to a desired reproducing track by feeding position information back thereto after it has monitored an amount of returned light in the tracking direction.

Figure 20:
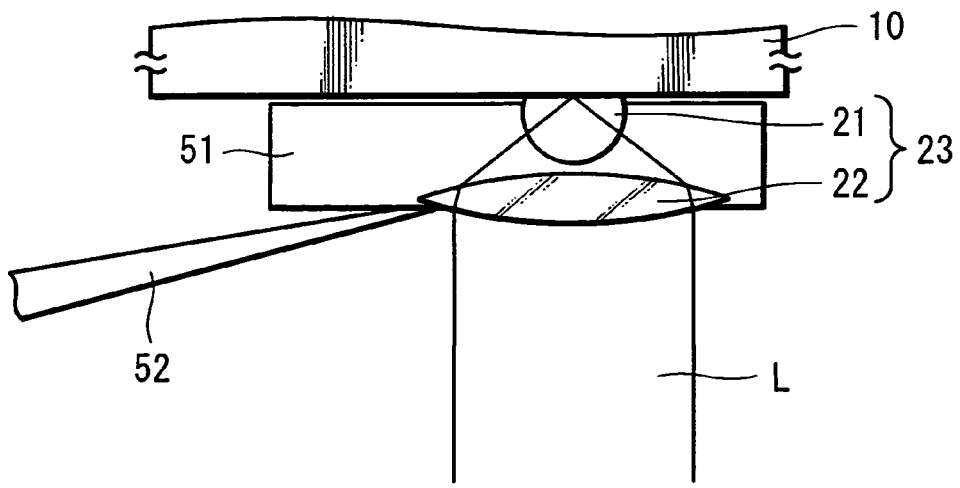
FIG. 20 is a schematic diagram showing an arrangement of a main portion of a further example of an optical recording and reproducing device according to the present invention.

FIG. 20 is a schematic diagram showing an arrangement of an example of the optical pickup device or the optical recording and reproducing device. As shown in FIG. 20, the objective lens 23 can be held on a slider 51 that is moved in the tracking direction, for example, under control of the biaxial actuator (not shown). This slider 51 is supported to a movable optical portion comprising the optical pickup device and which can be moved in the tracking direction through a resilient body such as a gimbal 52 having resiliency only in the direction of the surface runout of the optical recording medium 10.

This movable optical portion is moved in the tracking direction under control of a control drive means (not shown) composed of a suitable means such as a linear motor. Then, flow of gas produced as the optical recording medium 10 rotates flows into the space between the optical recording medium 10 and the slider 51 and a gas thin film that may balance with force to press the resilient body against the optical recording medium side also is formed, whereby the slider 51 can fly with a constant distance between it and the optical recording medium, for example, a distance of 50 nm.

More specifically, when information is reproduced from the optical recording medium while the optical recording medium is being rotated at a predetermined revolution rate, a distance between the first optical lens 21 constituting the objective lens 23 and the optical recording medium 10 can be kept substantially constant by the slider 51.

If necessary, this optical pickup device may include a relay lens (not shown) interposed between the first beam splitter 33 and the second optical lens 22 to correct a remaining focus error component produced when the biaxial actuator 40 for controlling the aforementioned objective lens 23 or the slider 51 has followed the surface runout of the optical recording medium 10 or an error component produced in the assembly process of the objective lens 4.

When the first optical lens 21 and the second optical lens 22 are held on the slider 51, as the means for correcting the remaining focus error component produced after the slider 51 and the error component produced when the objective lens 23 is assembled, the first optical lens 21 constituting the objective lens 23 may be secured to the slider 51 and the second optical lens 22 may be moved in the optical axis direction by a suitable means such as a piezoelectric element.

Figure 21:
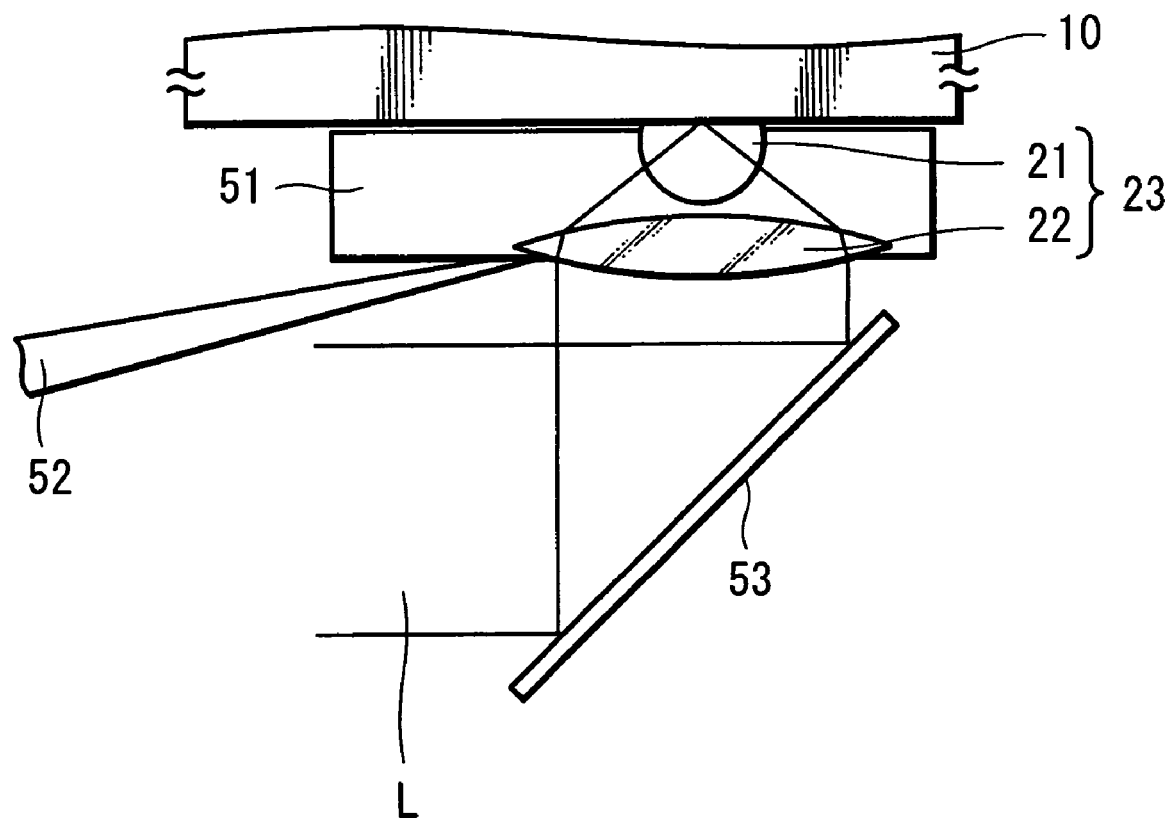
FIG. 21 is a schematic diagram showing an arrangement of a main portion of yet a further example of an optical recording and reproducing device according to the present invention.

In addition, FIG. 21 is a schematic diagram showing a main portion of a further example of the optical pickup device or the optical recording and reproducing device.

As shown in FIG. 21, in the case of an optical reproducing apparatus in which a spindle motor includes a means for attaching thereon a plurality of optical recording mediums, this arrangement in which a slider 51 includes a mirror 53 for bending an optical axis at substantially a right angle (i.e., substantially 90 degrees) become very effective.

Since the optical recording and reproducing apparatus having the aforementioned arrangement can decrease the spacing between it and the optical recording medium, the apparatus having the arrangement with a plurality of optical recording mediums attached thereto can be made compact and thin.

Inventive examples using specific materials will be described below.

In these inventive examples, the silicon oxide layer 2 and the silicon layer 3 were laminated on the substrate 1 by using the SOI technology and thereby the optical recording medium was constructed.

Figure 22:
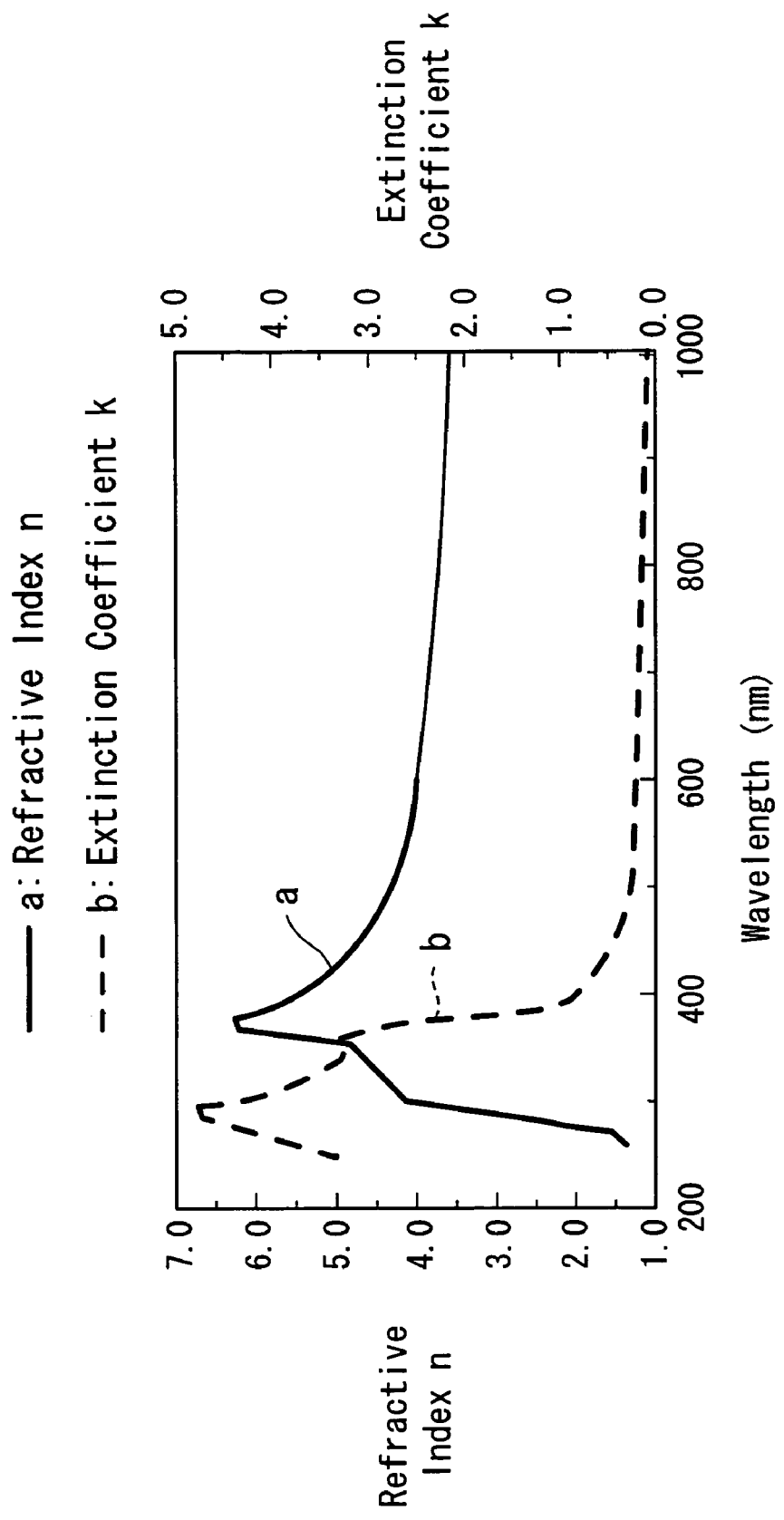
FIG. 22 is a diagram showing wavelength dependences of a refractive index and an extinction coefficient of silicon.
Figure 23:
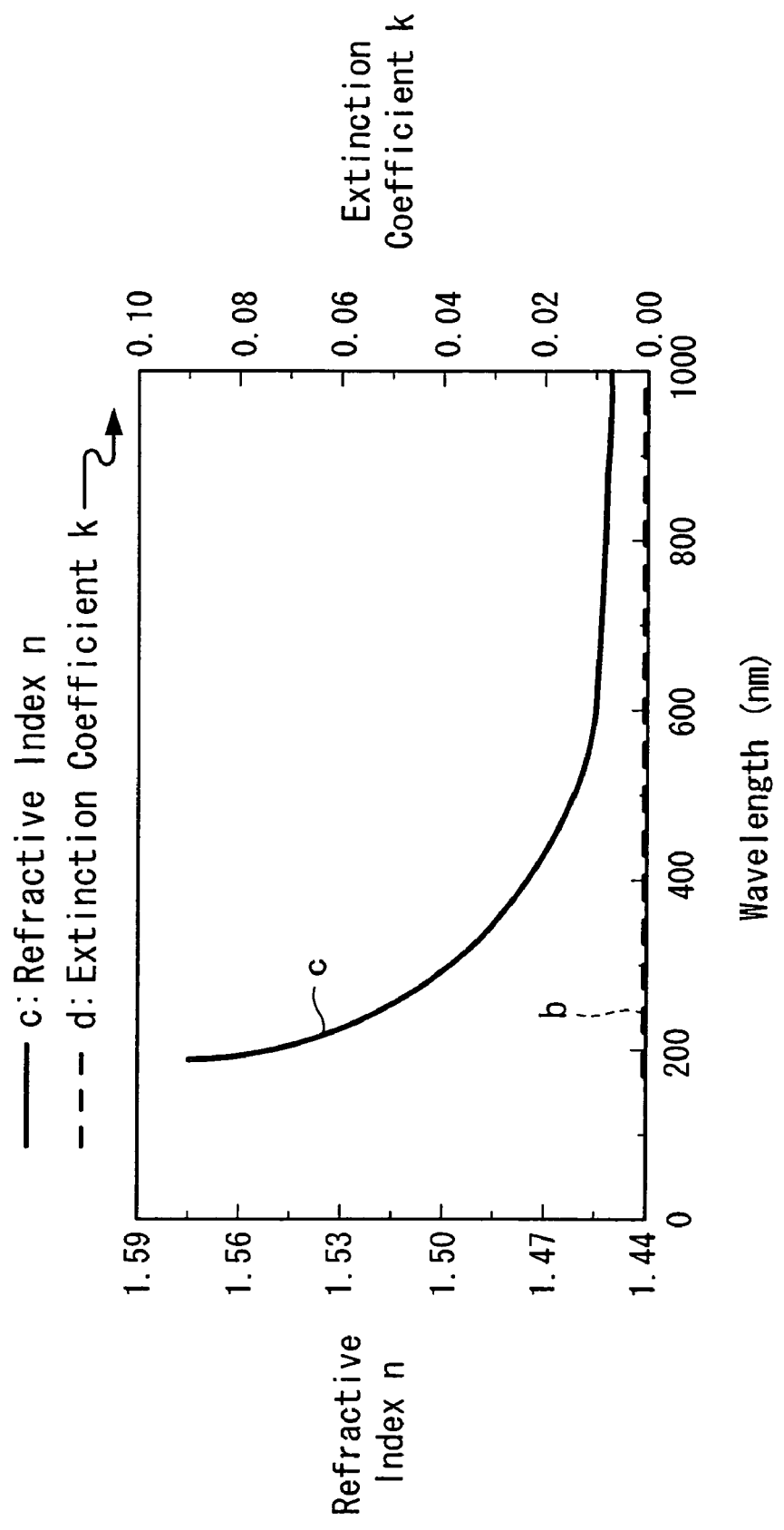
FIG. 23 is a diagram showing wavelength dependences of a refractive index and an extinction coefficient of silicon oxide.

FIGS. 22 and 23 show wavelength dependences of refractive indexes and extinction coefficients of silicon and silicon oxide, respectively. The refractive indexes and extinction coefficients of silicon and silicon oxide were measured by using a spectroscopic ellipsometer manufactured and distributed by J. A. Woollam Japan under the trade name of "VASE".

In FIG. 22, a solid line a represents a refractive index n and a dashed-line b an extinction coefficient k. As is clear from FIG. 22, silicon has a relatively large refractive index in the wavelength region in which a wavelength ranges from 380 nm to 1000 nm and exhibits a high refractive index higher than 3.0 at the wavelength near a wavelength of 400 nm. It is to be understood that, since the refractive index higher than 3.0 is sufficiently large relative to the numerical aperture of the objective lens, silicon is the material suitable for realizing the near-field optical recording and reproducing system by constructing the recording portion with the refractive index larger than the numerical aperture as described above.

Also, silicon has a proper absorption coefficient when recorded pits are formed by illumination of light of proper energy, and hence silicon sufficiently absorbs light and generates heat so that it becomes possible to change silicon into silicon oxide.

On the other hand, a refractive index of the silicon oxide is relatively small in the wavelength region in which a wavelength ranges from 380 nm to 1000 nm and its value is approximately 1.5 at the wavelength near a wavelength of 400 nm as shown by a solid-line c in FIG. 23. Since this relatively small refractive index of approximately 1.5 is a sufficiently small value as compared with that of silicon, it can obtain an optical interference effect and hence it is the material suitable for realizing the near-field recording and reproducing system. Also, the extinction coefficient of the silicon oxide is substantially null, that is, transparent in the wavelength range of 380 nm to 1000 nm as shown by a dashed-line d in FIG. 23 and hence it can avoid a temperature from rising when it absorbs extra light. Furthermore, the silicon oxide is the material suitable for realizing the near-field optical recording and reproducing system.

As is clear from the above-mentioned descriptions, the optical recording medium having the arrangement produced by using the silicon and the silicon oxide as the optical recording medium according to the near-field optical recording and reproducing system is more reliably suitable as the application to the optical system including the objective lens with the numerical aperture greater than 1 as compared with the related art.

Therefore, information can be recorded on and reproduced from the optical recording medium manufactured by this material through the objective lens with the numerical aperture greater than 1 in the near-field optical recording and reproducing system. Since the area of the beam spot of the laser beam focused in this case can be reduced in inverse proportion to the square of the numerical aperture, it becomes possible to provide an optical pickup device and an optical recording and reproducing device that can record and reproduce an optical recording medium having a density approximately ten times as high as the recording density obtained when the numerical aperture of the objective lens for use with a DVD is 0.6.

Next, the optical recording medium thus manufactured was reproduced by the optical pickup device and the optical recording and reproducing device including an objective lens with a numerical aperture of 1.86 and reproduced signals were estimated based upon the changes of the refractive index of the silicon layer 3 of the optical recording medium.

When a signal is recorded on the optical recording medium, a random signal having a bit length 100 nm that has been modulated by a (1,7) RLL modulation system was recorded by a light source that emits light having a wavelength of 405 nm.

Thereafter, the recorded pit signal was reproduced from this optical recording medium by the optical recording and reproducing apparatus including the above-mentioned optical system. At that time, a very clear signal pattern was observed as the signal waveform.

Figure 24:
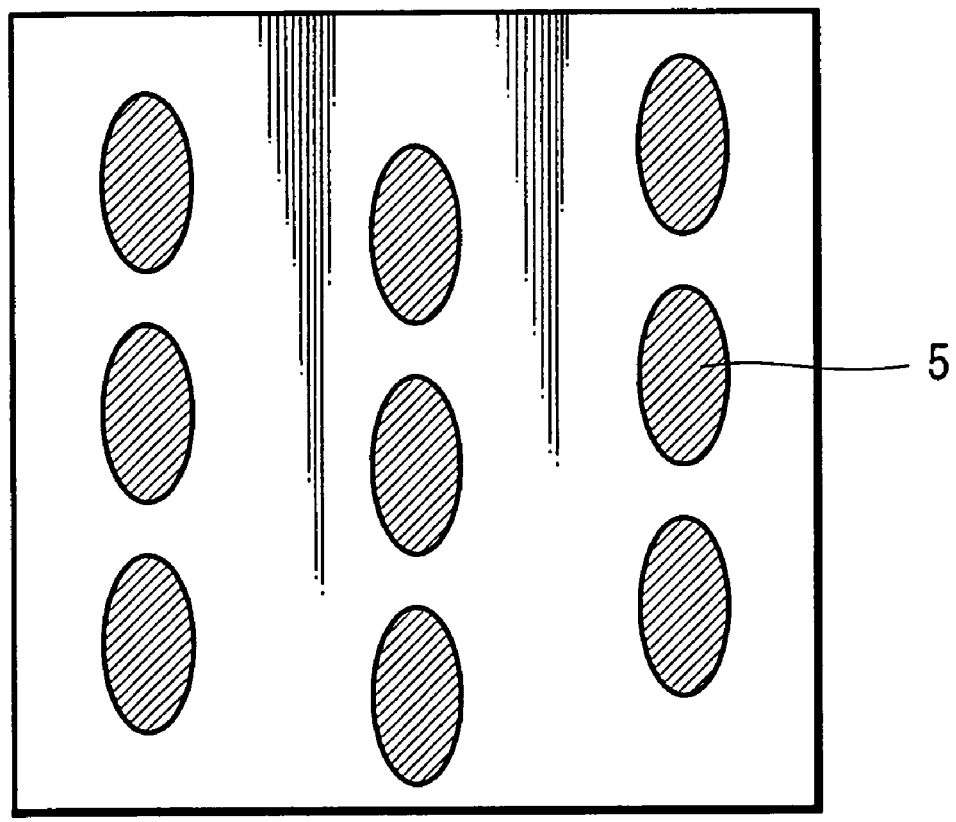
FIG. 24 is a schematic representation used to explain recorded pits according to the inventive example of the optical recording medium.

Further, when the silicon layer 3 of the optical recording medium was observed by a differential interferometry microscope, as schematically shown in FIG. 24, recorded pits 5 whose refractive index has been changed could be observed clearly.

In this case, the recorded pits 5 of the silicon layer 3 are changed into the silicon oxide, and hence it is to be understood that the refractive index could be changed sufficiently.

From the above-mentioned results of the inventive examples, it is to be understood that the optical recording medium having the arrangement according to the present invention can increase the effective numerical aperture that could not be realized in the related art to record information thereon with more satisfactory reproducing characteristics. Accordingly, it is to be understood that, since the silicon oxide layer 2, in particular, is formed on the optical recording medium, the silicon layer 3 that absorbs light to generate heat adjoins the silicon oxide layer 2 of which heat insulating effect is high so that this silicon oxide layer 2 plays the role of a so-called recording sensitivity adjustment film to form recorded pits with satisfactory characteristics to thereby obtain a satisfactory reproduced pattern.

Simultaneously, since the satisfactory reproducing characteristic can be obtained by the near-field optical recording and reproducing system in which the optical recording medium and the objective lens are located close to each other with a distance of approximately several 10 s of nanometers, the surface of the optical recording medium according to the present invention is clean and has a very flat characteristic. Therefore, it is to be understood that the optical recording medium according to the present invention can avoid disadvantages in which the surface of the optical recording medium is deformed in a convex fashion and in which a substance on the surface of the optical recording medium is evaporated and attached to the surface of the objective lens after the recorded pits have been formed.

Further, since the above-mentioned near-field optical recording and reproducing system can obtain the satisfactory reproduced pattern although the spot diameter of the laser beam focused by the objective lens is very small, it is clear that the material of the optical recording medium according to the present invention is the material having durability against extremely large rise of temperature on the surface of the optical recording medium.

Furthermore, since the optical recording medium according to the present invention is composed of the silicon and the silicon oxide, these materials are not harmful for the natural environment and have small load to the natural environment, and hence the optical recording medium according to the present invention can be made of a recyclable material. More specifically, when general consumers consume and waste the recordable-type optical mediums as the personal computers are widespread in recent years, a load to the natural environment can be restrained as much as possible.

Further, according to the present invention, the thickness of the air layer between the objective lens and the optical recording medium, that is, the space, shown by the reference letter a in FIG. 2, between the objective lens and the surface of the optical recording medium is set to be 50 nm, whereby a diameter of a bundle of light realized by the objective lens with the numerical aperture greater than 1 can be reduced and also the optical recording medium can positively be recorded and reproduced in the near-field recording and reproducing system in response to the light source with a wavelength ranging from 200 nm to 500 nm that is expected to be developed as the optical recording medium is becoming higher in recording density and larger in storage capacity. Therefore, it becomes possible to reliably realize the optical recording medium and the optical recording and reproducing method in which the recording density and the storage capacity can be increased. Also, it becomes possible to realize the optical pickup device and the optical recording and reproducing device using the above-mentioned optical recording medium and the above-mentioned optical recording and reproducing method.

As set forth above, according to the optical recording medium and the optical recording and reproducing method of the present invention, with respect to the objective lens of which numerical aperture NA is greater than 1, since the refractive index n of the recording portion of the uppermost surface of at least the optical recording medium is selected to be greater than the numerical aperture NA of the objective lens, the numerical aperture, which has been a limit numerical aperture in the related art, can be realized. Therefore, it is possible to provide the optical recording medium and the optical recording and reproducing method in which satisfactory recording and reproducing characteristics can be obtained even when the diameter of the beam spot realized by the objective lens is reduced.

Further, according to the present invention, since the recorded pits recorded on the silicon layer are changed into silicon oxide and thereby formed, it is possible to provide the optical recording medium in which satisfactory reproducing characteristics can reliably be obtained in the near-field optical recording and reproducing system.

Furthermore, according to the present invention since the protective layer made of the material of which refractive index is greater than the numerical aperture of the objective lens is formed on the silicon layer, the objective lens and the optical recording medium can be prevented from being damaged and hence durability of the optical recording medium can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical recording system including a recording/reproducing optical head having an objective lens and an optical radiation source for emitting light having a wavelength of between 300 nm and 500 nm, and an optical recording medium recorded and reproduced with irradiation of light thereon from said optical head, said irradiation of light being made by the objective lens of which numerical aperture is larger than 1 when irradiated with a light wavelength of substantially 400 nm, said optical recording medium comprising at least a silicon oxide layer and a silicon layer being formed over a substrate in that order, wherein said silicon layer has formed thereon a protective layer of which refractive index is larger than a numerical aperture of said objective lens, and wherein said objective lens is comprised of a system of two lenses, at least one of which is a solid immersion lens (SIL) and said solid immersion lens is shaped like a conical surface;

wherein said silicon oxide layer is formed directly on said substrate, said silicon layer is formed directly on said silicon oxide layer, and said protective layer is formed directly on said silicon layer, and wherein both said silicon layer and said protective layer have a refractive index larger than a numerical aperture of said objective lens when irradiated with a light wavelength of substantially 400 nm.

2. The optical recording system according to claim 1, wherein said recorded pits are recorded by changing said silicon layer into silicon oxide.

3. An optical recording and reproducing method for recording and reproducing data from an optical recording medium with irradiation of light having a wavelength of between 300 nm and 500 nm from an objective lens contained in an optical recording/reproducing head, said light being irradiated through the objective lens having a numerical aperture larger than 1 when irradiated with a light wavelength of substantially 400 nm, wherein said optical recording medium has at least a silicon oxide layer, a silicon layer, and a protective layer formed over a substrate, in that order, recorded pits being formed by changing said silicon layer into silicon oxide, and a refractive index of the protective layer is larger than a numerical aperture of said objective lens, and wherein said objective lens is comprised of a system of two lenses, at least one of which is a solid immersion lens (SIL) and said solid immersion lens is shared like a conical surface;

wherein said silicon oxide layer is formed directly on said substrate, said silicon layer is formed directly on said silicon oxide layer, and said protective layer is formed directly on said silicon layer, and wherein both said silicon layer and said protective layer have a refractive index larger than a numerical aperture of said objective lens when irradiated with a light wavelength of substantially 400 nm.

4. The optical recording system according to claim 1, wherein both said silicon layer and said protective layer have a refractive index larger than a numerical aperture of said objective lens when irradiated with a light wavelength of substantially 400 nm.

5. The optical recording and reproducing method according to claim 3, wherein both said silicon layer and said protective layer have a refractive index larger than a numerical aperture of said objective lens when irradiated with a light wavelength of substantially 400 nm.

6. The optical recording system according to claim 1, wherein the refractive index of the silicon recording layer is greater than 4 when irradiated by said light.

7. The optical recording and reproducing method according to claim 3, wherein the refractive index of the silicon recording layer is greater than 4 when irradiated by said light.

8. The optical recording system according to claim 1, wherein said solid immersion lens (SIL) has a main component material selected from the group consisting of $SrTiO_3$, $Bi_4Ge_2O_{12}$, and $Bi_4Ge_3O_{12}$.

9. The optical recording and reproducing method according to claim 3, wherein said solid immersion lens (SIL) has a main component material selected from the group consisting of $SrTiO_3$, $Bi_4Ge_2O_{12}$, and $Bi_4Ge_3O_{12}$.

10. The optical recording system according to claim 1, wherein the composition of the SIL lens is selected so as to cause the objective lens to have an overall numerical aperture larger than 1 when irradiated with a light wavelength of substantially 400 nm.

11. The optical recording system according to claim 1, wherein the silicon oxide layer has a refractive index less than 1.5 when irradiated with a light wavelength of substantially 400 nm.

12. The optical recording system according to claim 1, wherein every layer of the optical recording medium is comprised of a silicon compound.

13. The optical recording system according to claim 1, wherein the optical recording medium contains only layer compositions that are not harmful for the natural environment and have small load to the natural environment.

* * * * *